E. HOPKINSON & T. MIDGLEY.
METHOD OF CURING OR VULCANIZING THE OUTER SHOES OR CASINGS OF PNEUMATIC TIRES.
APPLICATION FILED DEC. 19, 1905.
901,007. Patented Oct. 13, 1908.
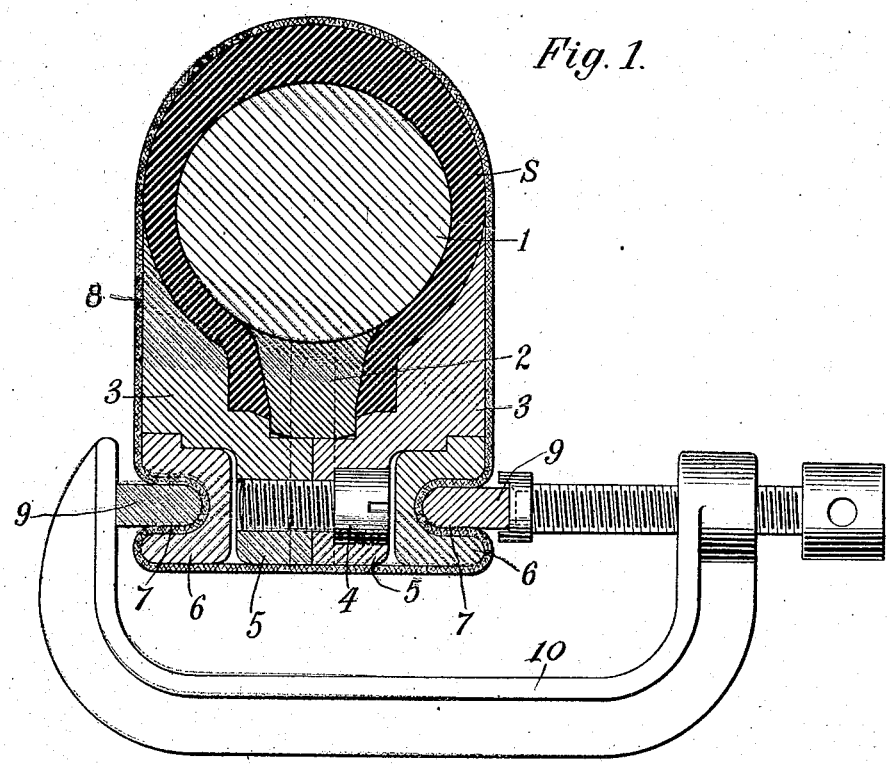
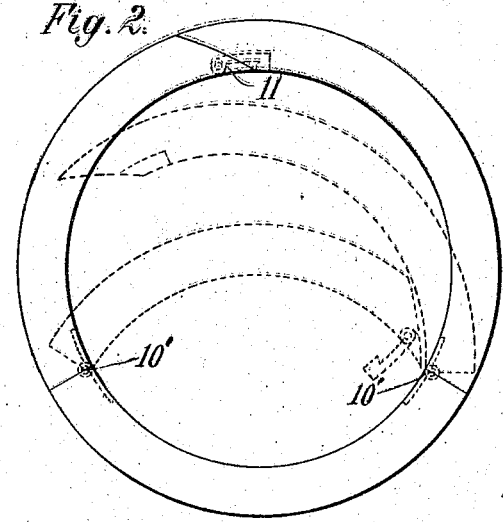
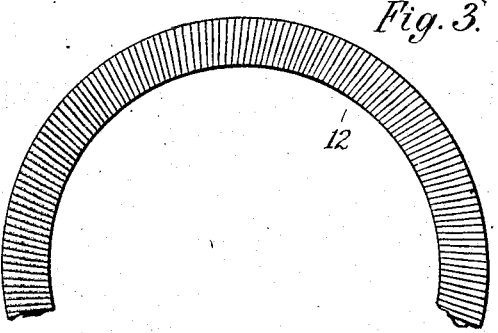
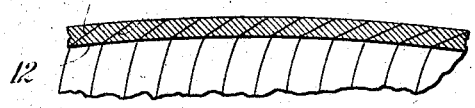

UNITED STATES PATENT OFFICE.

ERNEST HOPKINSON, OF EAST ORANGE, NEW JERSEY, AND THOMAS MIDGLEY, OF HARTFORD, CONNECTICUT; SAID HOPKINSON ASSIGNOR TO THE HARTFORD RUBBER WORKS COMPANY, OF HARTFORD, CONNECTICUT, A CORPORATION OF CONNECTICUT.

METHOD OF CURING OR VULCANIZING THE OUTER SHOES OR CASINGS OF PNEUMATIC TIRES.

No. 901,007.  Specification of Letters Patent.  Patented Oct. 13, 1908.

Application filed December 19, 1905. Serial No. 292,444.

*To all whom it may concern:*

Be it known that we, ERNEST HOPKINSON and THOMAS MIDGLEY, citizens of the United States, residing in East Orange, in the county of Essex and State of New Jersey, and in Hartford, in the county of Hartford and State of Connecticut, respectively, have invented a new and useful Improvement in Methods of Curing or Vulcanizing the Outer Shoes or Casings of Pneumatic Tires, of which the following is a specification.

This invention relates to a method of curing or vulcanizing the outer shoes or casings of pneumatic tires for vehicles, and it has for its object the improvement in the method of vulcanizing or curing such outer sheaths or casings by means of what is known as "an open heat," whereby the curing or vulcanizing may be effected in a single exposure to live steam.

The method forming the present invention will be hereinafter described in detail in connection with the accompanying drawings in which we have illustrated apparatus adapted for use in practicing the process.

In the drawings: Figure 1 is a view in transverse section through the entire apparatus in operative relation to a tire shoe or casing. Fig. 2 is a view in side elevation of one form of collapsible core. Fig. 3 is a view in side elevation (with part broken away) of another form of core. Fig. 4 is a detail view in cross-section through a strip of spring metal adapted for use in making a core of the character illustrated in Fig. 3.

The curing or vulcanizing of outer shoes or casings of pneumatic tires for vehicles has hitherto been accomplished either by a single exposure to heat in a metallic mold completely covering the entire shoe or casing, or by curing or vulcanizing in a mold a skeleton or carcass of the outer shoe or casing, then partially curing a separate tread strip, and finally applying the partially cured tread strip to the skeleton or carcass by means of vulcanizable cement and exposing the entire outer shoe or casing thus made up, to the action of live steam in a suitable chamber. In this latter method of curing, the tread strip receives its final curing treatment with live steam, and the vulcanizing of the cement by which the tread strip is secured is effected by means of the live steam, but the curing of the other portions of the tire is effected in the mold, and the further action, if any, of the live steam thereon is apt to be detrimental. In any event, three successive operations are required to effect the complete curing or vulcanization of the shoe or casing.

In order to effect the curing or vulcanization of the tire shoe or casing by means of live steam in the open heat process, it is necessary to hold the shoe or casing in proper shape during the action of the steam and to provide means for giving form to the margins of the shoe or casing during the curing or vulcanizing operation, but to leave the tread portion of the shoe or casing exposed to the direct action of the steam. To meet all these conditions, we preferably introduce within the uncured shoe or casing S a core 1 of suitable construction and proper cross-section, and place between the margins of the sheath or casing an abutment member 2 against which the margins are forced by means of clamping members 3 arranged external to the shoe or casing adjacent to the margins thereof. The core 1, the abutment member 2, and the clamping members 3 constitute a mold for the margins of the sheath or casing and the portions adjacent thereto. The clamping members 3 are secured in any suitable manner, as by screws 4 extending through lips or webs 5 extending inwardly from the clamping members, and rings 6 having deep channels 7 formed in their exposed side surfaces are fitted against the clamping members 3, or formed integral therewith, if preferred. The exposed lateral faces of the clamping members are tangential at their outer margins to the surface of the tire shoe or casing, so that a cover 8 of porous material, such as duck or other textile fabric, extending over the tire shoe or casing and the clamping members, will lie in close contact with all the exposed portions of the shoe or casing. To place the cover 8 under the tension required to produce upon the shoe or casing the desired pressure, two annuli 9 are employed to force the cover into the channel 7, and a suitable number of clamps or equivalent devices are used to press the annuli 9 into the position shown in Fig. 1. The clamp 10 illustrated in the drawings is one of a well-known type which may be employed for this purpose, but others may be substituted instead if desired.

When the shoe or casing has been mounted upon the core 1, clamped in position by means of the abutment member 2 and the clamping members 3, covered with the covering 8, and subjected to pressure by placing the cover under tension, as shown, the shoe or casing with the securing devices or cover is introduced into the drum or chamber for vulcanizing and is there subjected to the action of live steam, which penetrates the porous material of the cover 8 and acts directly upon the portions of the shoe or casing which are not covered by the clamping members 3. The portions of the shoe or casing covered by the clamping members 3 receive enough heat through these clamping members, which being made of metal are good conductors, and in this way the curing of the entire shoe or casing is effected at a single operation by which the tread, upon which the most severe wear is received, is cured by the direct action of live steam, while the other portions of the tire are cured by dry heat through the clamping members.

By means of the improved process, the number of operations necessary to effect the curing or vulcanization of the tire shoe or casing is reduced to one, and the danger of overcuring portions of the shoe or casing is entirely eliminated.

The apparatus employed in carrying out the process or method above outlined may be varied considerably, and I have illustrated only typical apparatus for the purpose. The core 1 illustrated in Fig. 1 is preferably made in three sections connected together by means of hinges 10' as shown in Fig. 2 and provided with a latch 11 to secure the sections in proper relation when the core is in position within the tire shoe or casing. Instead of this form of core, one made of a strip 12 of spring metal, having the edges beveled as at 13 in Fig. 4, may be employed. The strip 13 is formed into a spiral of uniform diameter throughout with whirls overlapped as indicated, and the ends of the strips of metal are then secured together so as to form an endless structure, which has sufficient compressibility and expansibility to be easily introduced within a tire shoe or casing and removed therefrom.

The cover 8, which is employed to hold the tread portion of the shoe or casing in proper shape and prevent the rubber from running, is preferably formed of a long and comparatively narrow strip of fabric bound spirally around the shoe or casing and the supporting and securing devices, but this form of cover may be dispensed with and others employed, if preferred.

Having thus described our invention, what we claim is:—

1. The method of vulcanizing or curing outer shoes or casings for pneumatic tires for vehicles which consists in supporting the shoe or casing upon a core, placing an abutment member between the margins of the shoe or casing, clamping the shoe or casing firmly upon the core and against the abutment member, but leaving the tread portion of the shoe or casing exposed, placing a covering of textile fabric over the exposed tread portion of the shoe or casing and in contact therewith, and in subjecting the shoe or casing so supported and covered to the action of vulcanizing heat.

2. The method of curing or vulcanizing outer shoes or casings for pneumatic tires, which consists in supporting and clamping the shoe or casing so as to hold it in the form which it is intended to retain when vulcanized and leaving the tread portion of the casing above the clamping means exposed, placing a covering of porous material over such exposed portion of the casing and in contact therewith and also over the outer portions at least of the outer sides of the clamping means, subjecting such covering to lateral tension applied at the sides below the peripheries of the clamping means to create a pressure on the shoe or casing, and exposing the shoe or casing so covered and supported to the action of live steam.

In testimony whereof, we have signed our names in the presence of two witnesses.

ERNEST HOPKINSON.
THOMAS MIDGLEY.

Witnesses:
BAXTER MORTON,
H. RICHARD WÖBSE.